(12) United States Patent
Ishimaru

(10) Patent No.: US 8,049,913 B2
(45) Date of Patent: Nov. 1, 2011

(54) IMAGE MONITORING SYSTEM FOR PREVENTING CONFIDENTIAL INFORMATION OUTFLOW, IMAGE MONITORING METHOD, AND COMPUTER IMAGE MONITORING PROGRAM STORED ON A COMPUTER READABLE MEDIUM

(75) Inventor: Kohji Ishimaru, Sakai (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1008 days.

(21) Appl. No.: 11/987,107

(22) Filed: Nov. 27, 2007

(65) Prior Publication Data

US 2008/0151313 A1 Jun. 26, 2008

(30) Foreign Application Priority Data

Dec. 21, 2006 (JP) ................................. 2006-344811

(51) Int. Cl.
*G06K 15/00* (2006.01)
(52) U.S. Cl. ..................... 358/1.14; 358/1.15; 340/572.1
(58) Field of Classification Search ................... 358/1.1, 358/1.14, 1.15, 400, 403, 296; 340/571, 340/572.1
See application file for complete search history.

(56) References Cited

U.S. PATENT DOCUMENTS

| 6,362,893 | B1 * | 3/2002 | Francis et al. ............... 358/1.14 |
| 2004/0041707 | A1 | 3/2004 | Hull et al. | |
| 2005/0168766 | A1 * | 8/2005 | Troyansky et al. .......... 358/1.14 |
| 2006/0049250 | A1 | 3/2006 | Sullivan | |
| 2006/0103533 | A1 | 5/2006 | Pahlavan et al. | |

FOREIGN PATENT DOCUMENTS

| JP | 2002-120475 | 4/2002 |
| JP | 2004-066692 | 3/2004 |
| JP | 2004-094949 | 3/2004 |
| JP | 2004276515 A * | 10/2004 |
| JP | 2005-031153 | 2/2005 |
| JP | 2005-141429 A | 6/2005 |
| JP | 2005-332185 | 12/2005 |
| JP | 2006-243893 | 9/2006 |
| JP | 2006-252230 | 9/2006 |
| JP | 2008-521287 | 6/2008 |
| WO | WO 2006/031360 | 3/2006 |
| WO | WO 2006/055431 | 5/2006 |

OTHER PUBLICATIONS

Notice of Ground of Rejection in JP 2006-344811 dated Jan. 6, 2009, and an English Translation thereof.

* cited by examiner

*Primary Examiner* — Thomas D Lee
(74) *Attorney, Agent, or Firm* — Buchanan Ingersoll & Rooney PC

(57) ABSTRACT

In order to prevent a sheet of paper on which confidential information is formed as an image from being taken out, an MFP has a print data accepting portion to accept print data, an image-forming portion to form an image based on the print data onto a sheet of paper having an RFID tag provided with a memory and a data communication portion, an RFID reader/writer control portion to acquire tag identification information for identifying the RFID tag provided by the sheet of paper on which the image is formed based on the print data, a definition data control portion to store definition data including the acquired tag identification information, an external reader communication portion to communicate with a communicable RFID reader, and an abnormal state detecting portion to judge as an abnormal state the case where the external reader communication portion communicating with a communicable RFID reader is detected to be non-communicable with the RFID tag specified by the tag identification information included in the definition data.

16 Claims, 13 Drawing Sheets

FIG. 10

DEFINITION DATA

| DATA IDENTIFICATION INFORMATION | USER IDENTIFICATION INFORMATION | TAG IDENTIFICATION INFORMATION |
|---|---|---|

F I G. 1 4
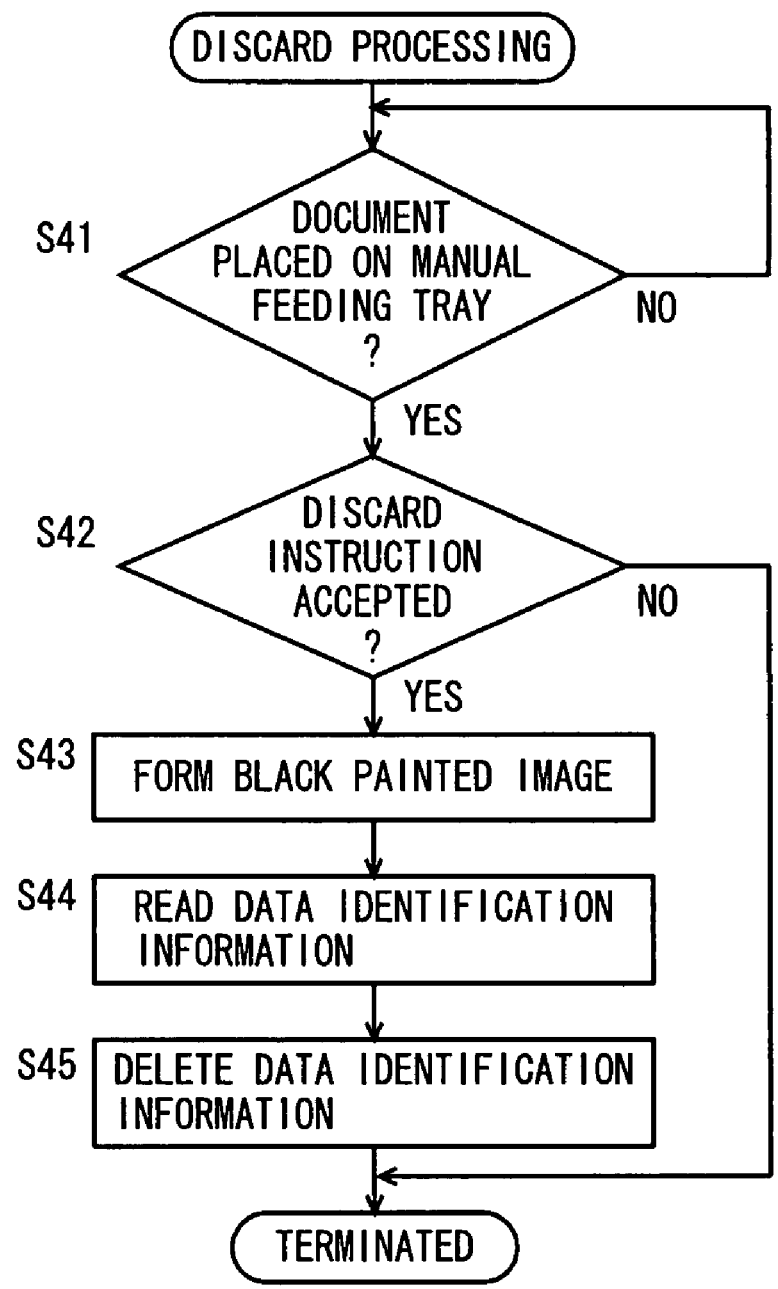

F I G. 1 5
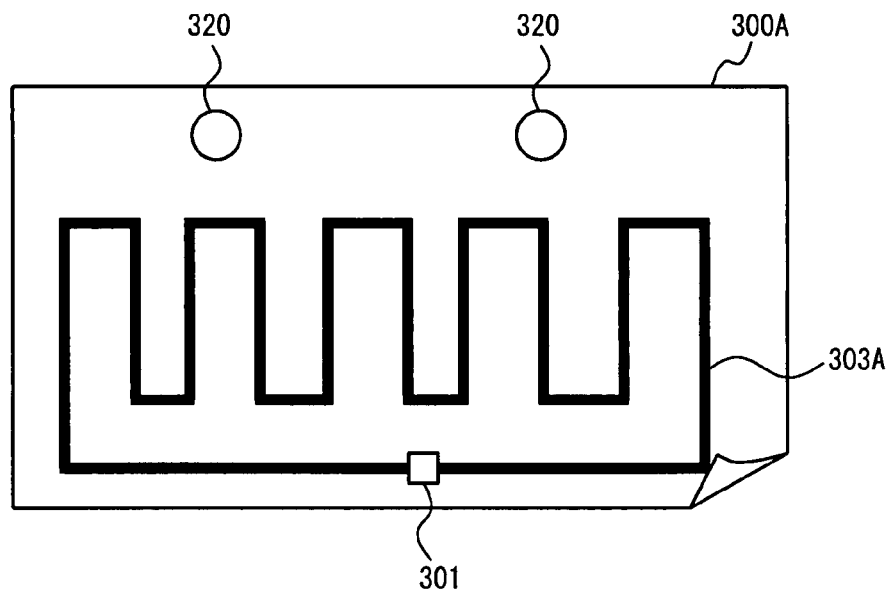
F I G. 1 6
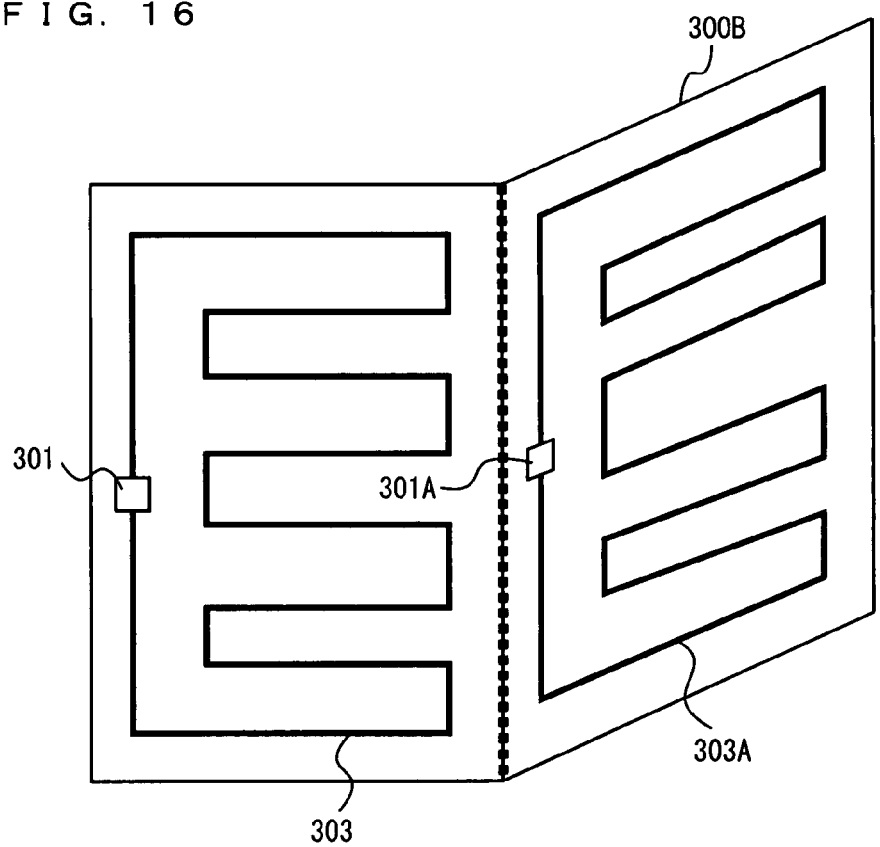

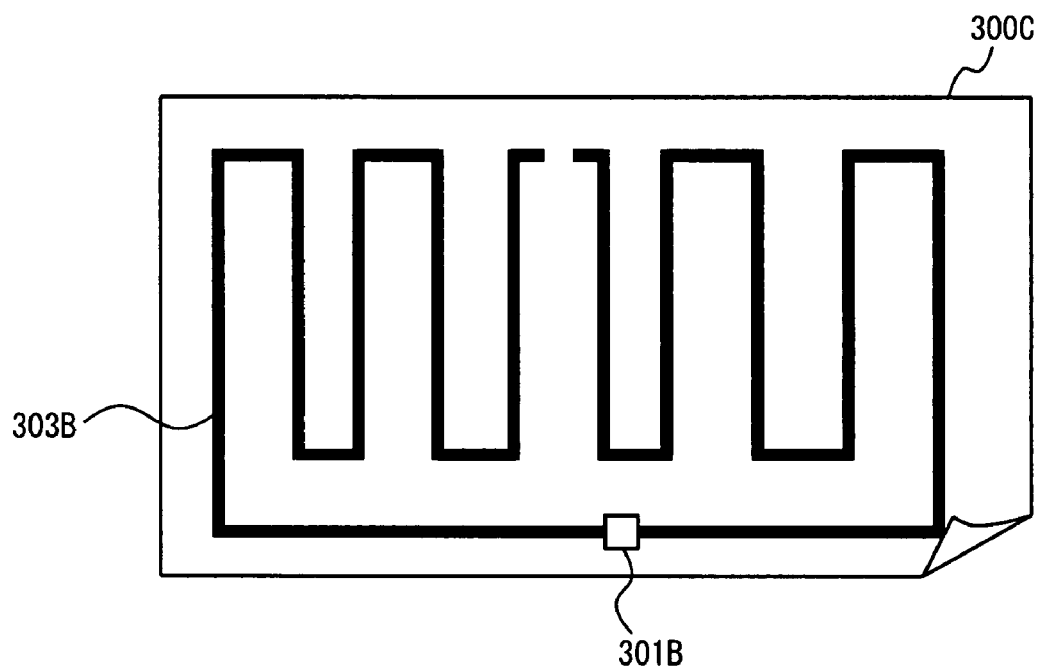
F I G. 1 7

IMAGE MONITORING SYSTEM FOR PREVENTING CONFIDENTIAL INFORMATION OUTFLOW, IMAGE MONITORING METHOD, AND COMPUTER IMAGE MONITORING PROGRAM STORED ON A COMPUTER READABLE MEDIUM

This application is based on Japanese Patent Application No. 2006-344811 filed with Japan Patent Office on Dec. 21, 2006, the entire content of which is hereby incorporated by reference.

BACKGROUND OF THE INVENTION

1. Field of the Invention

The present invention relates to an image monitoring system, an image monitoring method, and an image monitoring program stored on a computer readable medium, and more particularly, to an image monitoring system for preventing confidential information outflow, an image monitoring method for preventing confidential information outflow, and an image monitoring program stored on a computer readable medium.

2. Description of the Related Art

In recent years, there is a need for prevention of leakage of confidential information. This is not limited to confidential information recorded in computers as electronic information; when confidential information is formed as images onto sheets of paper, these sheets of paper are need to be kept under control. The sheets of paper can be controlled by attaching thereto an RFID (Radio Frequency Identification) tag provided with a memory and a communication device.

Japanese Laid-Open Patent Publication No. 2005-141429 describes a parking-lot control apparatus comprising: a memory means to, for every piece of car identification information for identifying a car using a parking lot, store a communication address for information notification to an authenticated user of the car to which the car identification information is assigned; a first reading means to read the car identification information from the car when passing through a gate located in the parking lot; a second reading means to read user identification information for identifying the user passing through the gate in the car, the user identification information being read from a recording medium or a mobile terminal carried by the user; a judging means to judge whether the car is being used by an authenticated user of the car based on a reading result from the first reading means and a reading result from the second reading means; and a transmission means to, when the judging means judges that the car is not being used by an authenticated user of the car, read from the memory means a communication address corresponding to the car identification information read by the first reading means and to transmit information denoting that an unauthorized car use has occurred to the communication address.

According to the parking-lot control apparatus described in the No. 2005-141429 publication, the car identification information and the user identification information are read at the gate of the parking lot. Thus it is inevitable that the car should pass through the gate in order to drive the car out of the parking lot. In addition, the detection of unauthorized car use is disabled when the car passes through the gate with the car's identification information removed from the car.

SUMMARY OF THE INVENTION

The present invention is made to solve the aforementioned problem. An object of the present invention is to provide an image monitoring system capable of preventing a recording medium in which confidential information is formed as images from being taken out.

Another object of the present invention is to provide an image monitoring method and an image monitoring program embodied on a computer readable medium capable of preventing a recording medium in which confidential information is formed as images from being taken out.

In order to achieve the aforementioned object, according to an aspect of the present invention, an image monitoring system includes: a print data accepting portion to accept print data; an image-forming portion to form an image based on the print data onto a recording medium provided with a radio communication device having a memory and a communication portion; a device identification information acquiring portion to acquire device identification information for identifying the radio communication device provided by the recording medium having formed thereon the image based on the print data; a definition data storing portion to store definition data including the acquired device identification information; a monitoring portion to communicate with a communicable radio communication device; and an abnormal state detecting portion to judge as an abnormal state a case where the monitoring portion is detected to be non-communicable with the radio communication device specified by the device identification information included in the definition data.

According to this aspect, it is made possible to provide an image monitoring system capable of preventing a recording medium in which confidential information is formed as images from being taken out.

According to another aspect of the present invention, an image monitoring system includes: a print data accepting portion to accept print data; an image-forming portion to form an image based on the print data onto a recording medium provided with a radio communication device having a memory and a communication portion; a write control portion to transmit data identification information for identifying the print data to the radio communication device provided by the recording medium having formed thereon the image based on the print data and cause the data identification information to be written on the memory; a definition data storing portion to store definition data including the data identification information; a monitoring portion to communicate with a communicable radio communication device; and an abnormal state detecting portion to judge as an abnormal state a case where the monitoring portion is detected to be non-communicable with a radio communication device storing the same data identification information as the data identification information included in the definition data.

According to this aspect, it is made possible to provide an image monitoring system capable of preventing a recording medium in which confidential information is formed as images from being taken out.

According to another aspect of the present invention, a method for monitoring an image includes: accepting print data; forming an image based on the print data onto a recording medium provided with a radio communication device having a memory and a communication portion; acquiring device identification information for identifying the radio communication device provided by the recording medium having formed thereon the image based on the print data; storing definition data including the device identification information; communicating with a communicable radio communication device; and judging as an abnormal state a case where in the communicating step, communication with the radio communication device specified by the device identification information included in the definition data is detected to be impossible.

According to this aspect, it is made possible to provide an image monitoring method capable of preventing a recording medium in which confidential information is formed as images from being taken out.

According to another aspect of the present invention, an image monitoring program stored on a computer readable medium for causing a computer to execute processing includes the steps of: accepting print data; forming an image based on the print data onto a recording medium provided with a radio communication device having a memory and a communication portion; acquiring device identification information for identifying the radio communication device provided by the recording medium having formed thereon the image based on the print data; storing definition data including the device identification information; communicating with a communicable radio communication device; and judging as an abnormal state a case where in the communicating step, communication with the radio communication device specified by the device identification information included in the definition data is detected to be impossible.

According to this aspect, it is made possible to provide such an image monitoring program stored on a computer readable medium that is capable of preventing a recording medium in which confidential information is formed as images from being taken out.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a diagram showing an example of the format of definition data.

FIG. 14 is a flowchart showing an example of discard processing.

FIG. 15 is a second plan view of the sheet of paper on which the RFID tag is mounted.

FIG. 16 is a third view of the sheet of paper on which the RFID tag is mounted.

FIG. 17 is a fourth plan view of the sheet of paper on which the RFID tag is mounted.

DESCRIPTION OF THE PREFERRED EMBODIMENTS

Figure 1:
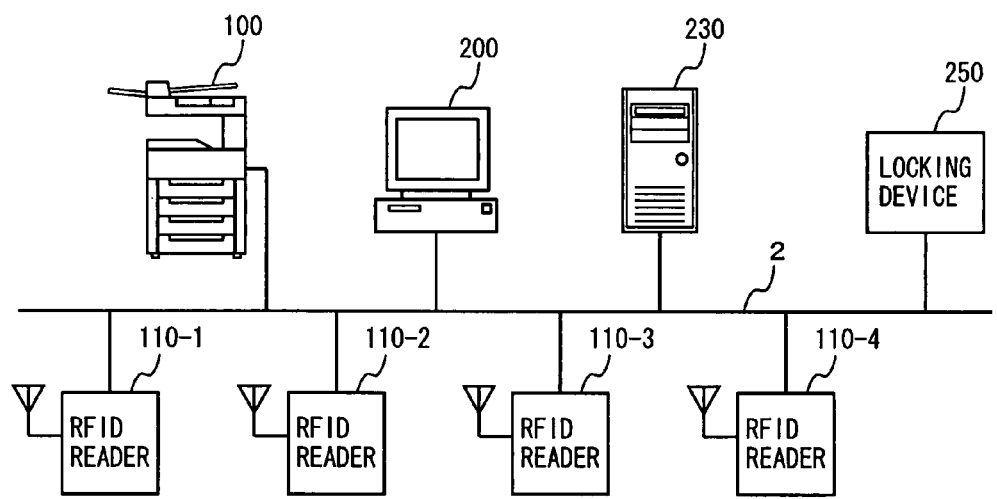
FIG. 1 is a schematic diagram of an image monitoring system according to an embodiment of the present invention.

An embodiment of the present invention will be described below with reference to the drawings. In the following description, the same or corresponding parts are denoted by the same reference characters. Their names and functions are also the same. Thus, a detailed description thereof will not be repeated.

FIG. 1 is a schematic diagram of an image monitoring system according to an embodiment of the present invention. Referring to FIG. 1, an image monitoring system 1 includes a multi-function peripheral (herein referred to as "MFP") 100 as an image-forming apparatus, four RFID readers 110-1 to 110-4 as monitoring means, a personal computer (hereinafter referred to as "PC") 200, a server 230, and a locking device 250, all of which are connected to a network 2.

PC 200 and server 230 are usual computers. The hardware structure and function of the computers are well known and therefore will not be repeated here. Locking device 250 has the function of locking the doors of the gate of the rooms where RFID readers 110-1 to 110-4 are located in order to close the rooms.

While in this embodiment MFP (Multi Functional Peripheral) 100 is taken as an example of the image-forming apparatus, any other apparatus, such as a printer and a facsimile, can substitute MFP 100 insofar as the image forming function is equipped. Network 2 is a local area network (LAN), and the connection can be either by wire or radio. Also, network 2 is not limited to a LAN and can be a wide area network (WAN), the public switched telephone network (PSTN), or the Internet.

In image monitoring system 1 according to this embodiment, an RFID tag is mounted on a sheet of paper on which images are to be formed by MFP 100. The RFID tag is a radio communication device and provided with a memory and a data communication portion. The data communication portion carries out short-distance communication with the RFID reader/writer in a non-contact manner by induction field or radio wave. The data communication portion can be of either the electromagnetic type or the passive type and use any frequency for communication. MFP 100 is provided with an RFID reader/writer for, when an image is formed on a sheet of paper, communicating with the RFID tag mounted on the sheet of paper to read tag identification information (device identification information) for identifying the RFID tag and for writing data identification information for identifying data that is to be formed into image.

The user carries a user-dedicated RFID tag. The user-dedicated RFID tag is mounted on, for example, the name tag carried by the user. While the user-dedicated RFID tag has a similar structure to that of the RFID tag mounted on the sheet of paper, the user-dedicated RFID tag is different from the tag on the paper in that the user-dedicated RFID tag stores in the memory thereof user identification information for identifying the user.

Each of RFID readers 110-1 to 110-4 is located at a predetermined position of room and controlled by MFP 100. Each of RFID readers 110-1 to 110-4 communicates with the RFID tag mounted on the sheet of paper, reads tag identification information for identifying the RFID tag, and transmits the tag identification information to MFP 100.

Figure 2:
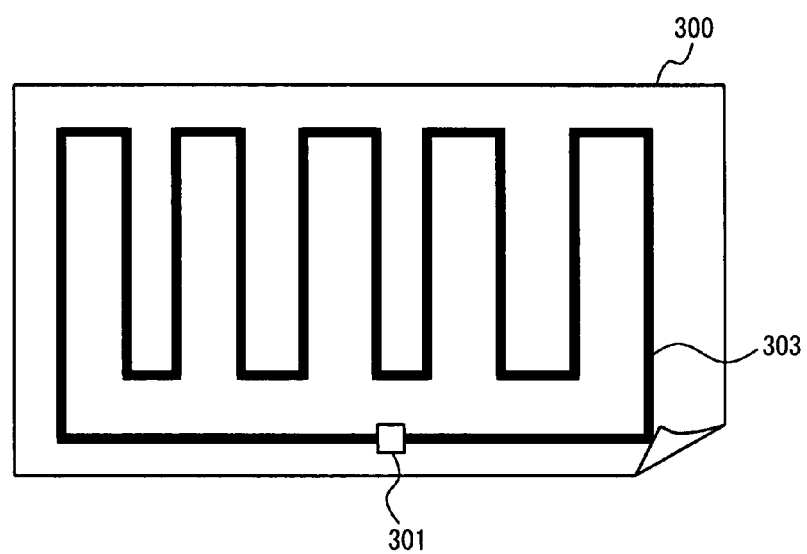
FIG. 2 is first plan view of a sheet of paper on which an RFID tag is mounted.

FIG. 2 is first plan view of a sheet of paper on which an RFID tag is mounted. Referring to FIG. 2, an RFID tag 301 is mounted on a sheet of paper 300. RFID tag 301 is connected to an RFID antenna 303. It is noted that while RFID tag 301 and RFID antenna 303 are explicitly shown in the figure for description, in fact RFID tag 301 and RFID antenna 303 are usually implanted into sheet of paper 300 and thus are difficult to recognize by human eye. RFID antenna 303 is located so as to cover substantially the entire surface of sheet of paper 300. Thus, when the sheet of paper is divided into at least two pieces, RFID antenna 303 is cut off. When RFID antenna 303 is cut off, RFID tag 301 becomes non-communicable.

Figure 3:
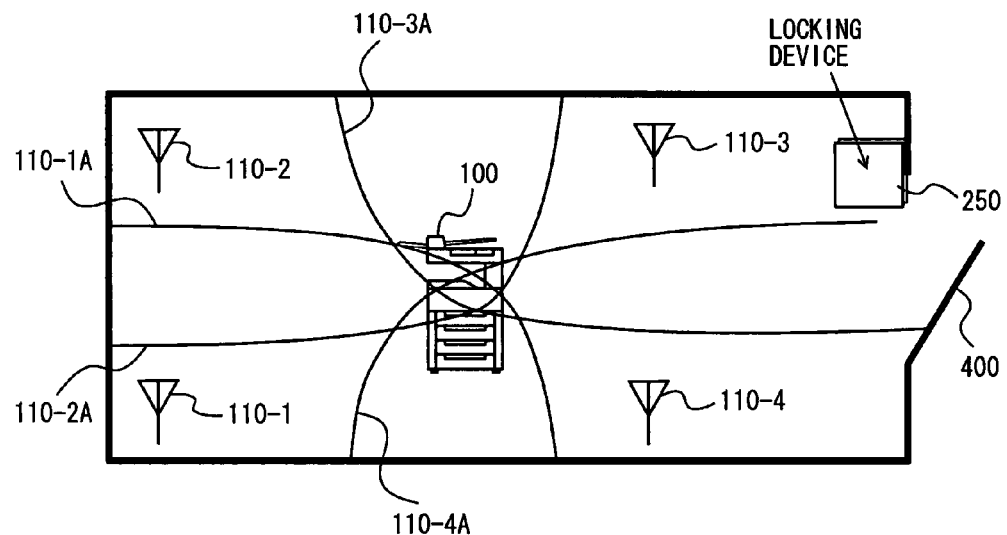
FIG. 3 is a diagram showing an example of location of RFID readers.

FIG. 3 is a diagram showing an example of location of the RFID readers. Referring to FIG. 3, RFID readers 110-1 to 110-4 are located at the four corners of a room. While in this embodiment the case of locating four RFID readers 110-1 to 110-4 is exemplified, the number of the RFID readers is not limited to four and can be at least one.

For short-distance communication with RFID tag 301, RFID readers 110-1 to 110-4 each have a communicable range, which has an upper limit. For the sake of description, the figure explicitly shows communicable ranges 110-1A, 110-2A, 110-3A, and 110-4A, respectively corresponding to RFID readers 110-1 to 110-4. Communicable range 110-1A of RFID reader 110-1 partially overlaps with communicable ranges 110-2A, 110-3A, and 110-4A of RFID readers 110-2 to 110-4, respectively, which are located around RFID reader 110-1.

MFP 100 is located in either communicable range 110-1A, 110-2A, 110-3A, or 110-4A, which respectively correspond to RFID readers 110-1 to 110-4. Thus, RFID tag 301, mounted on a sheet of paper that is to be discharged after MFP 100 has formed an image thereon, becomes communicable with either RFID reader 110-1, 110-2, 110-3, or 110-4.

At the gate of the room a locking device 250 is located. Locking device 250 is controlled by MFP 100 to switch between locking and opening of a door 400.

Figure 4:
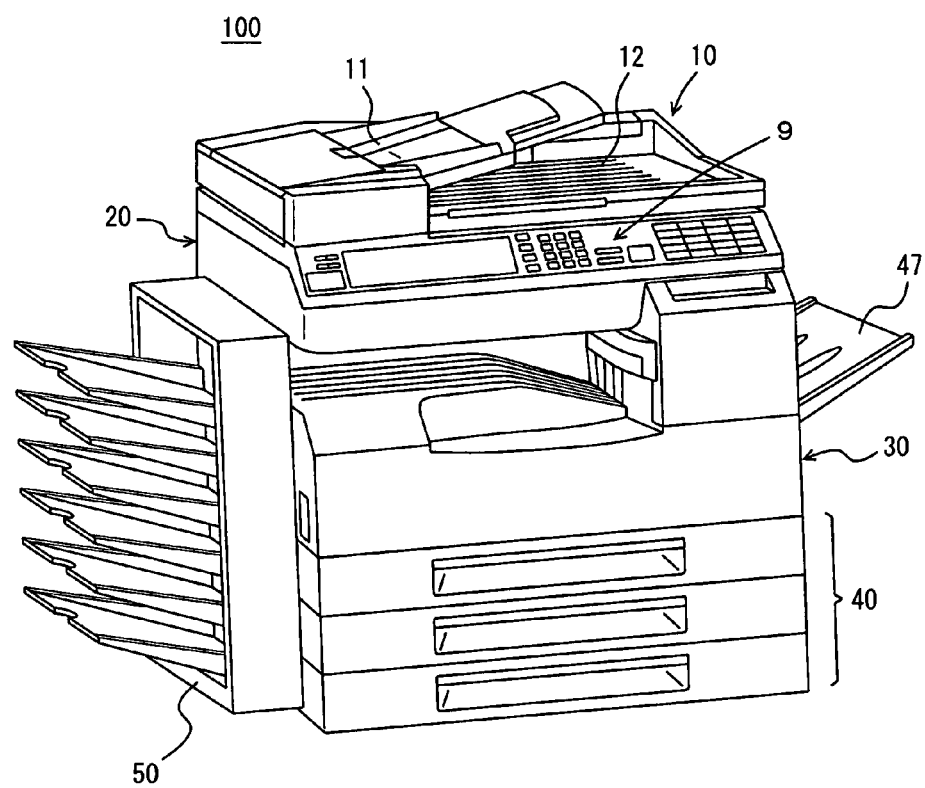
FIG. 4 is a perspective view of an MFP.
Figure 5:
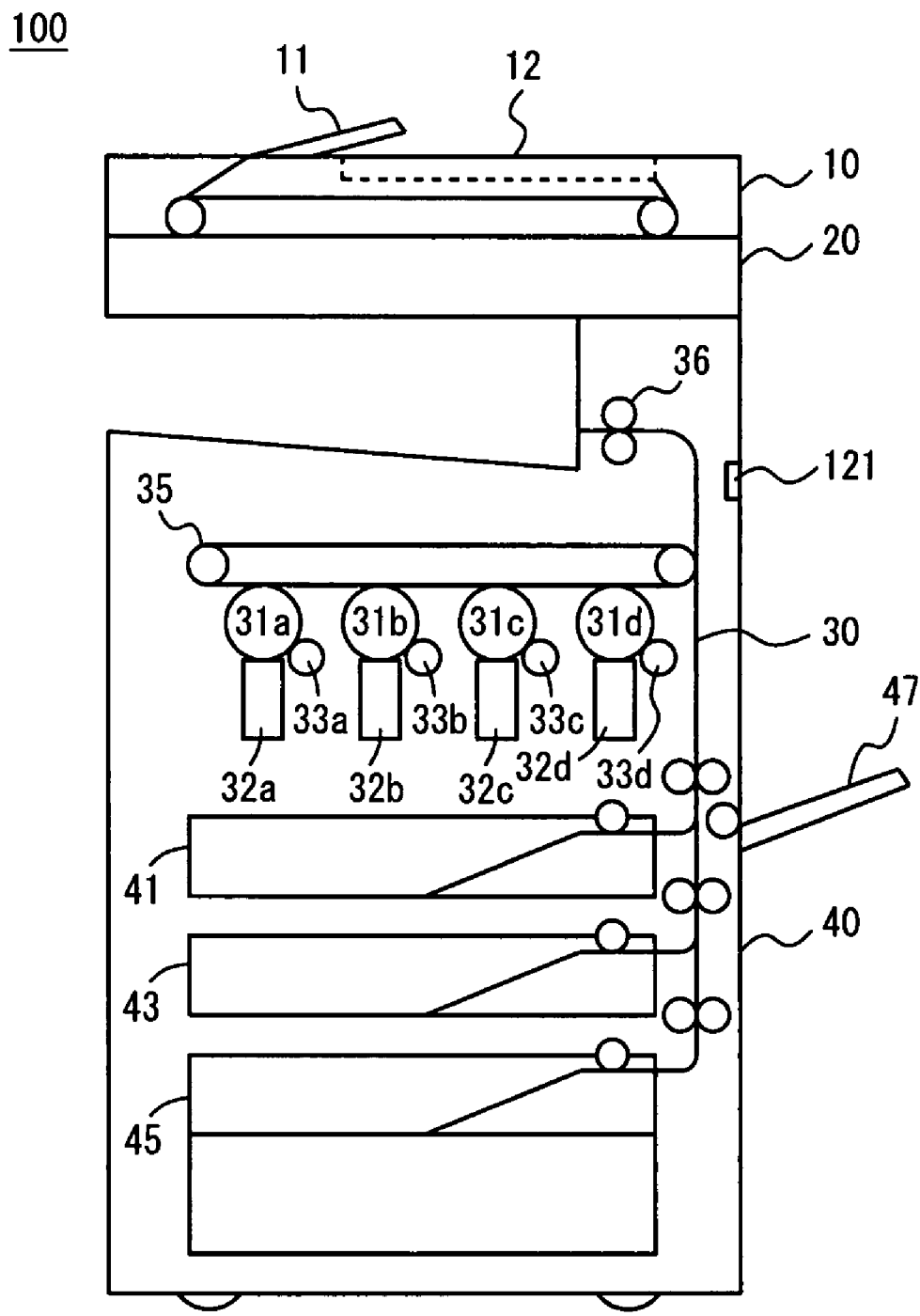
FIG. 5 is a cross sectional view of the MFP, showing the internal structure thereof.

FIG. 4 is a perspective view of the MFP. FIG. 5 is a cross sectional view of the MFP, showing the internal structure thereof. Referring to FIGS. 4 and 5, MFP 100 includes an automatic document feeder (ADF) 10, an image-reading portion 20, an image-forming portion 30, a paper feeding portion 40, an RFID reader/writer 121, and a post-processing portion 50.

ADF 10 automatically conveys a plurality of sheets of document placed on a document feeding tray 11 in a one-by-one manner to a predetermined reading position set on the platen glass of image-reading portion 20. ADF 10 then discharges a document having the image thereon and read by image-reading portion 20 onto a document discharge tray 12. Image-reading portion 20 includes a light source for radiating light on the document conveyed to the document reading position and a photoelectric transducer for receiving light reflected by the document, and scans the document image in accordance with the document size. The photoelectric transducer converts the received light into read data which is an electric signal and outputs the read data to image-forming portion 30.

Paper feeding portion 40 includes paper feeding trays 41, 43, and 45 for storing sheets of paper as recording media, and a manual feeding tray 47 for feeding sheets of paper from outside, and conveys a sheet of paper stored in paper feeding trays 41, 43, and 45 or placed on manual feeding tray 47 to image-forming portion 30.

Image-forming portion 30 forms images in a known electro-graphic system and includes photoreceptor drums 31a, 31b, 31c, and 31d, exposure units 32a, 32b, 32c, and 32d, development units 33a, 33b, 33c, and 33d, a transfer belt 35, and a fixing roller 36. Exposure units 32a, 32b, 32c, and 32d carry out various kinds of data processing such as shading correction against read data input from image-reading portion 20, and convert the processed data into a driving signal for driving a laser diode at every main scan line. Exposure units 32a, 32b, 32c, and 32d then scan photoreceptor drums 31a, 31b, 31c, and 31d, respectively, using laser light. Thus, an electrostatic latent image is formed on each of photoreceptor drums 31a, 31b, 31c, and 31d. Exposure units 32a, 32b, 32c, and 32d respectively correspond to four colors, yellow, magenta, cyan, and black, and have mounted therein a toner cartridge for storing a toner for each color. Development units 33a, 33b, 33c, and 33d place the toner on the electrostatic latent image formed on respective photoreceptor drums 31a, 31b, 31c, and 31d in order to form a toner image. The toner image formed on each of photoreceptor drums 31a, 31b, 31c, and 31d is transferred onto transfer belt 35 by a transfer charger. Transfer belt 35 superposes all the toner images on photoreceptor drums 31a, 31b, 31c, and 31d, which respectively correspond to the above mentioned colors, and transfers the toner images to a sheet of paper conveyed from paper feeding portion 40.

The sheet of paper on which an image is formed is conveyed to fixing roller 36 through a convey pathway passing in the vicinity of RFID reader/writer 121. The space defined by RFID reader/writer 121 and a part of the pathway for the sheet of paper is shielded to avoid being adversely affected by the magnetic field or electric field generated around image-forming portion 30.

The sheet of paper that has passed in the vicinity of RFID reader/writer 121 is heated by fixing roller 36 and conveyed to post-processing portion 50. The toner heated by fixing roller 36 is melted onto the sheet of paper.

Post-processing portion 50 discharges the sheet of paper on which an image is formed. Post-processing portion 50 has a plurality of discharge trays, which enables post-processing portion 50 to sort the sheets of paper on which an image is formed at the time of discharge. Post-processing portion 50 is also provided with a hole punching processing portion and a stapler processing portion, which enables post-processing portion 50 to subject discharged sheets of paper to punching processing and stapler processing. MFP 100 has on the top surface thereof an operation panel 9 serving as a user interface with the user.

While in this embodiment RFID reader/writer 121 is provided on the convey pathway through which the sheet of paper is conveyed from image-forming portion 30, it is possible for post-processing portion 50 to be provided with RFID reader/writer 121. RFID reader/writer 121 is provided at a position that enables writing of data identification information of print data that is to be formed into image onto sheet of paper 300.

Figure 6:
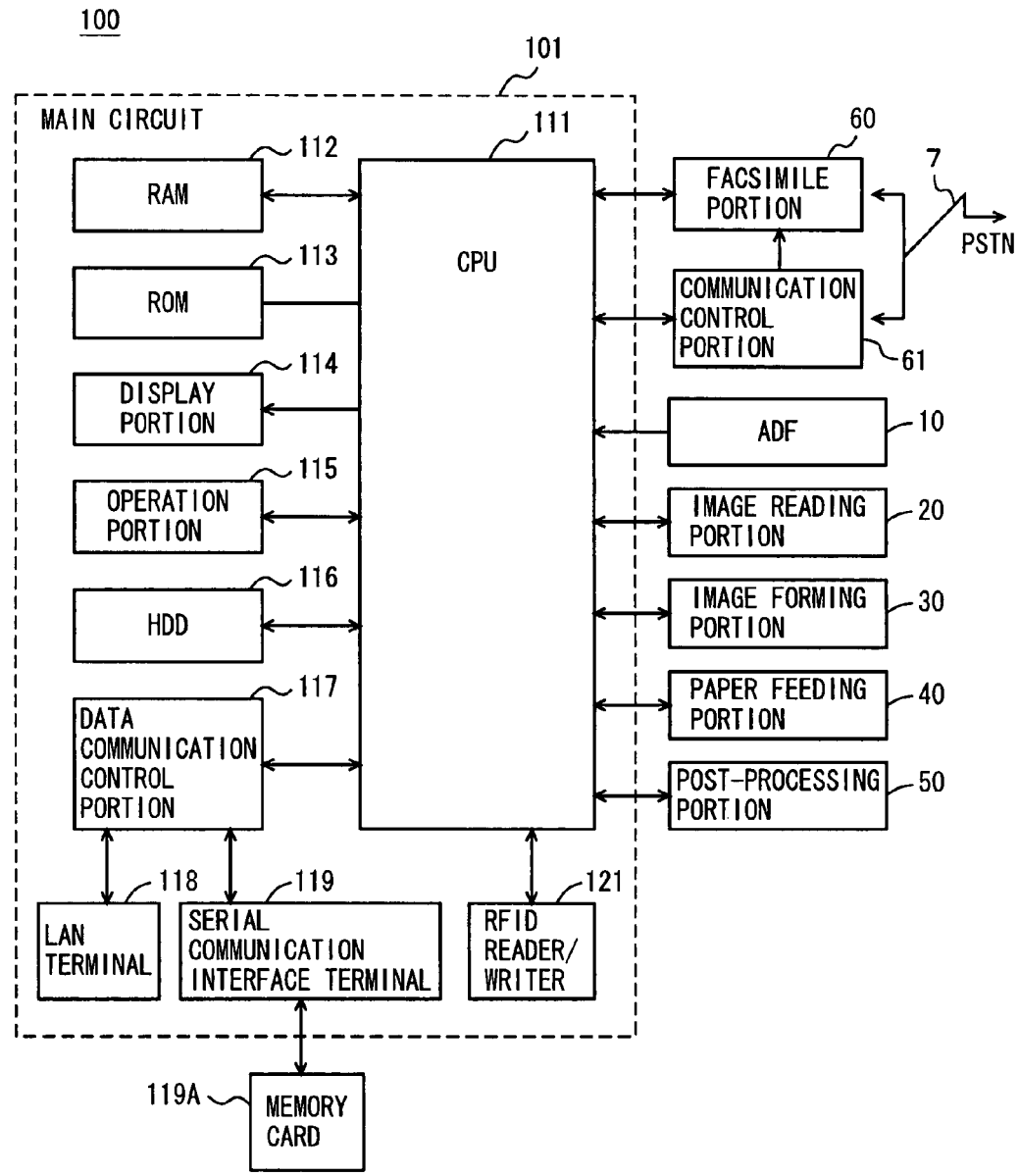
FIG. 6 is a block diagram showing an example of the circuit structure of the MFP.

FIG. 6 is a block diagram showing an example of the circuit structure of the MFP. Referring to FIG. 6, MFP 100 includes a main circuit 101, a facsimile portion 60, and a communication control portion 61. Main circuit 101 is connected to automatic document feeder (ADF) 10, image-reading portion 20, image-forming portion 30, paper feeding portion 40, and post-processing portion 50.

Main circuit 101 includes a central processing unit (CPU) 111, a RAM (Random Access Memory) 112 used as a working area for CPU 111, a ROM (Read Only Memory) 113 that stores a program or the like to be executed at CPU 111, a display portion 114, an operation portion 115, a hard disk drive (HDD) 116 as a mass storage, a data communication control portion 117, and RFID reader/writer 121.

CPU 111 is connected to display portion 114, operation portion 115, HDD 116, data communication control portion 117, and RFID reader/writer 121, and controls entire main circuit 101. CPU 111 is connected to facsimile portion 60, communication control portion 61, ADF 10, image-reading portion 20, image-forming portion 30, paper feeding portion 40, and post-processing portion 50, and controls the entire MFP 100.

Display portion 114 is a display device such as a liquid crystal display (LCD), an organic ELD (Electro-Luminescence Display), or the like, and displays an instruction menu for users, information about acquired information, and the like. Operation portion 115 has a plurality of keys and accepts users' input, which corresponds to the keys, of various instructions and data including characters and numbers. Operation portion 115 includes a touch panel provided on display portion 114. Display portion 114 and operation portion 115 constitute operation panel 9 provided on the top surface of MFP 100.

Data communication control portion 117 includes a LAN terminal 118 that is an interface for communication according to a communication protocol such as TCP (Transmission Control Protocol) and FTP (File Transfer Protocol), and a serial communication interface terminal 119 for serial communication. According to instructions from CPU 111, data communication control portion 117 transmits and receives data to and from an external apparatus connected to LAN terminal 118 or serial communication interface terminal 119.

When a LAN cable for connection to network 2 is connected to LAN terminal 118, data communication control portion 117 communicates with RFID readers 110-1 to 110-4, PC 200, server 230, and locking device 250, which are connected to data communication control portion 117 via LAN terminal 118. Data communication control portion 117 communicates with another computer connected to the Internet.

When an apparatus is connected to serial communication interface terminal 119, data communication control portion 117 communicates with the apparatus connected to serial communication interface terminal 119 such as a digital camera, a digital video camera, and a mobile information terminal in order to input or output image data. To serial communication interface terminal 119, a memory card 119A having a flash memory therein is also connectable. CPU 111 controls data communication control portion 117 to read, from memory card 119A, an image monitoring program to be executed by CPU 111, and stores the read image monitoring program in RAM 112 and executes the program.

Recording media that stores the image monitoring program executed by CPU 111 is not limited to memory card 119A and can also be the media that records a program in a fixed manner, such as a flexible disk, a cassette tape, an optical disk [CD-ROM (Compact Disc-Read Only Memory)/MO (Magnetic Optical Disc)/MD (Mini Disc)/DVD (Digital Versatile Disc)], an IC card (including a memory card), an optical card, and a semiconductor memory such as a masked ROM, an EPROM (Erasable Programmable ROM), an EEPROM (Electronically EPROM), and the like. It is also possible that CPU 111 downloads an image monitoring program from a computer connected to the Internet and stores it in HDD 116, or that a computer connected to the Internet writes an image monitoring program into HDD 116 so that the image monitoring program stored in HDD 116 is loaded into RAM 112 and executed in CPU 111. The program, as used herein, not only includes a program directly executable by CPU 101, but also a source program, a compressed program, an encrypted program, and the like.

Communication control portion 61 is a modem for connecting CPU 111 to PSTN 7. MFP 100 is assigned a telephone number in PSTN 7 in advance. When a facsimile connected to PSTN 7 makes a call to the telephone number assigned to MFP 100, communication control portion 61 detects the call. Upon detecting the call, communication control portion 61 establishes a communication for facsimile 60.

Facsimile portion 60 is connected to PSTN 7, and transmits facsimile data to PSTN 7 or receives facsimile data from PSTN 7.

RFID reader/writer 121 is controlled by CPU 111 and communicates with an FRID tag 301 that is mounted on a sheet of paper on which an image is formed by image-forming portion 30.

Figure 7:
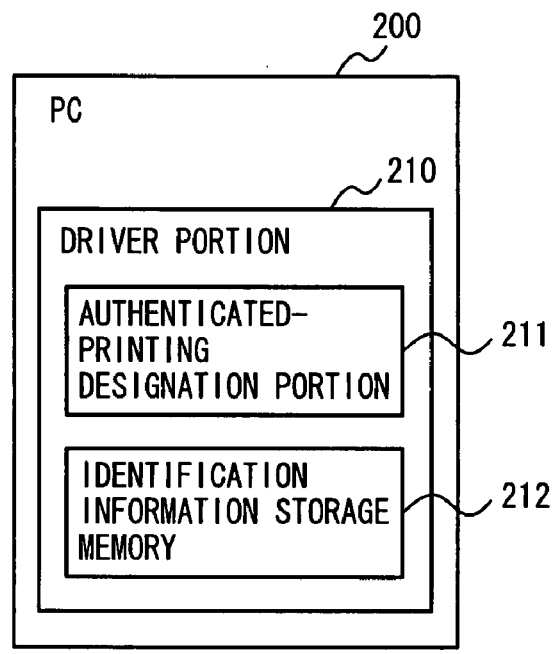
FIG. 7 is a functional block diagram schematically showing the function of a PC.

FIG. 7 is a functional block diagram schematically showing the function of the PC. Referring to FIG. 7, PC 200 has installed therein a driver program for controlling MFP 100, and CPU of PC 200 executes the driver program. The CPU of PC 200 includes a driver portion 210. Driver portion 210 includes an authenticated-printing designation portion 211 and an identification information storage memory 212. Authenticated-printing designation portion 211 accepts a designation of data that is an object of printing and a designation of authenticated printing. The designation of authenticated printing includes password designation. The authenticated printing here refers to such a print mode that an image is formed based on print data on condition that in MFP 100, the same password as a password received in addition to the print data is input to operation portion 115. Identification information storage memory 212 stores in advance user identification information for identifying the user. When authenticated-printing designation portion 211 accepts a designation of authenticated printing, driver portion 210 converts the designated data into print data and reads the user identification information stored in identification information storage memory 212. Driver portion 210 then transmits to MFP 100 print job including the read user identification information, the designated password, and the print data.

Figure 8:
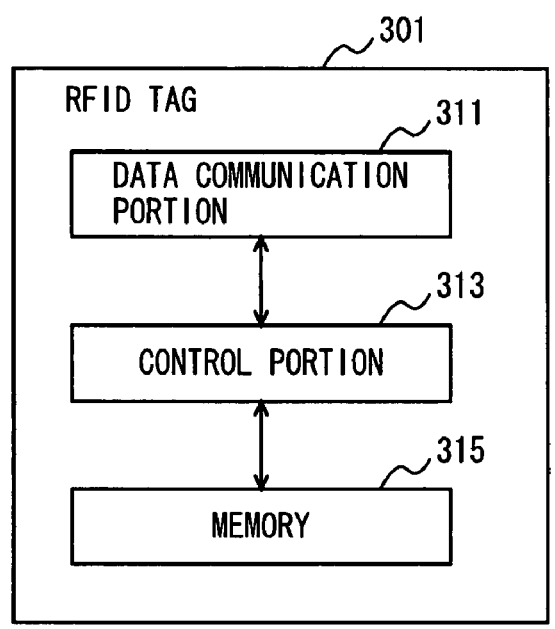
FIG. 8 is a functional block diagram schematically showing the function of the RFID tag.

FIG. 8 is a functional block diagram schematically showing the function of the RFID tag. Referring to FIG. 8, RFID tag 301 includes a data communication portion 311, a control portion 313, and a memory 315. Control portion 313 controls entire RFID tag 301. Data communication portion 311 communicates by radio with RFID readers 110-1 to 110-4 or RFID reader/writer 121. Data communication portion 311 outputs to control portion 313 a command received from RFID readers 110-1 to 110-4 or RFID reader/writer 121. Data communication portion 311 also reads data from memory 315 in response to an instruction from control portion 313 and transmits the read data to RFID readers 110-1 to 110-4 or RFID reader/writer 121. Memory 315 stores tag identification information for identifying RFID tag 301 and data input from control portion 313.

Figure 9:
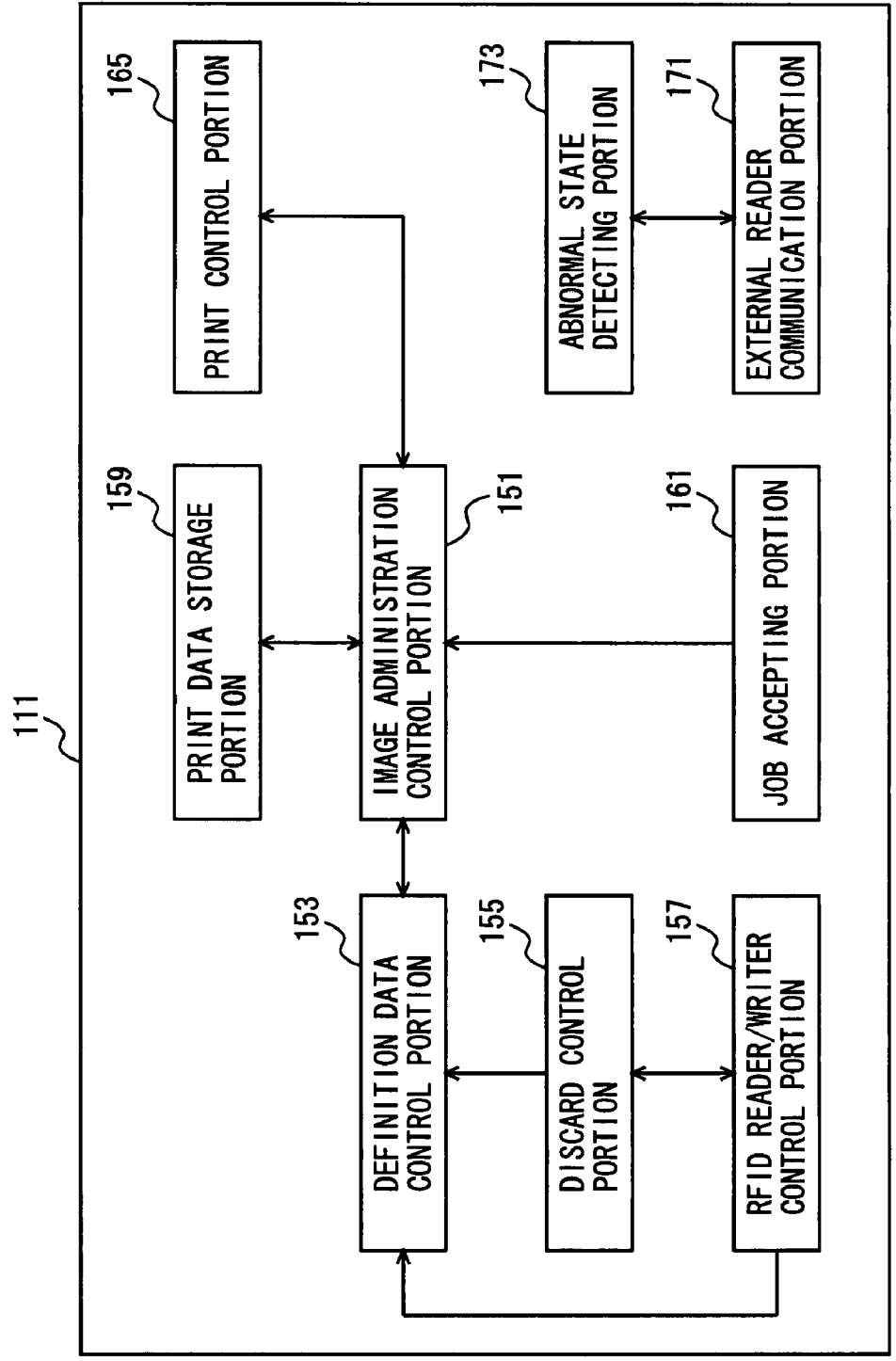
FIG. 9 is a functional block diagram schematically showing the function of CPU provided in the MFP.

FIG. 9 is a functional block diagram schematically showing the function of CPU provided in the MFP. Referring to FIG. 9, CPU 111 includes a job accepting portion 161 to accept a print job from PC 200, an image administration control portion 151 to administer the image formed on sheet of paper 300 by executing a job, a definition data control portion 153 to control definition data, an RFID reader/writer control portion 157 to control RFID reader/writer 121, a discard control portion 155 to leave an image out of control, a print data storage portion 159 to store print data, a print control portion 165 to control image-forming portion 30, an external reader communication portion 171, and an abnormal state detecting portion 173.

Job accepting portion 161 accepts a print job from PC 200. When data communication control portion 117 receives a print job from PC 200 via LAN 2, job accepting portion 161 accepts the print job from data communication control portion 117 and outputs the accepted print job to image administration control portion 151.

When the print job input from job accepting portion 161 includes a password, image administration control portion 151 judges that authenticated printing is designated for the input job, outputs the print data and password included in the print job to print data storage portion 159, and outputs to definition data control portion 153 data identification information for identifying the print data and the user identification information included in the print job.

Print data storage portion 159 stores the input combination of the print data and the password in RAM 112. Definition data control portion 153 generates definition data that associates the input data identification information and user identification information and stores the definition data in RAM 112.

FIG. 10 is a diagram showing an example of the format of the definition data. Referring to FIG. 10, the definition data includes the data identification information, user identification information, and tag identification information. The tag identification information will be described later.

Referring back to FIG. 9, when the user inputs an authenticated-printing instruction in operation portion 115, image administration control portion 151 displays on display portion 114 the data identification information for identifying the print data stored in RAM 112 by print data storage portion 159. When the user inputs an instruction to designate the data identification information displayed on display portion 114 and a password, image administration control portion 151 accepts the data identification information and the password from operation portion 115. Image administration control portion 151 then refers to the combination of the print data and password stored in RAM 112 by print data storage portion 159 in order to judge whether the password accepted from operation portion 115 matches the password that makes a combination with the print data specified by the data identification information accepted from operation portion 115. When the passwords match, image administration control portion 151 outputs to print control portion 165 the print data specified by the data identification information accepted from operation portion 115 and causes image-forming portion 30 to form an image. Image administration control portion 151 also outputs the data identification information accepted from operation portion 115 to RFID reader/writer control portion 157. Image-forming portion 30 forms an image onto sheet of paper 300 based on the print data.

RFID reader/writer control portion 157 controls RFID reader/writer 121 to cause RFID reader/writer 121 to read from RFID tag 301 the tag identification information for identifying RFID tag 301 mounted on sheet of paper 300, and at the same time write the data identification information in memory 315. RFID reader/writer control portion 157 then accepts from RFID reader/writer 121 the tag identification information read from RFID tag 301. RFID reader/writer control portion 157 outputs to definition data control portion 153 the data identification information and the tag identification information read by RFID reader/writer 121. Definition data control portion 153, when the data identification information and the tag identification information are input from RFID reader/writer control portion 157, adds the tag identification information to the definition data including the data identification information. Thus, since the definition data associates the data identification information and the tag identification information, the sheet of paper onto which the print data is formed into image can be specified based on the tag identification information.

External reader communication portion 171 controls RFID readers 110-1 to 110-4. Abnormal state detecting portion 173, when the tag identification information is added to the definition data by definition data control portion 153, reads the definition data and monitors the sheet of paper with the tag identification information defined by the definition data. Specifically, abnormal state detecting portion 173 causes, via external reader communication portion 171, each of RFID readers 110-1 to 110-4 to transmit a command at predetermined time intervals to inquire whether RFID readers 110-1 to 110-4 are communicable with RFID tag 301 specified by the tag identification information defined by the definition data. Each of RFID readers 110-1 to 110-4 transmits a communication demand including the tag identification information. Among RFID tags 301 that have received the communication demand, only RFID tag specified by the tag identification information included in the communication demand responds thereto, and thus the RFID reader that receives the response among RFID readers 110-1 to 110-4, in other words, the RFID reader existing within the communicable range of RFID tag 301 is communicable with RFID tag 301. Here the case where RFID reader 110-1 is communicable with RFID tag 301 will be exemplified.

RFID reader 110-1 transmits to the external reader communication portion 171 a signal denoting that RFID reader 110-1 is communicable with RFID tag 301. Thus, abnormal state detecting portion 173 receives via external reader communication portion 171 the signal denoting communicability transmitted from RFID reader 110-1. Abnormal state detecting portion 173 judges as normal the case where any one of RFID readers 110-1 to 110-4 is communicable with RFID tag 301 specified by the tag identification information defined by the definition data. When, however, either of RFID readers 110-1 to 110-4 is no longer communicable with RFID tag 301 specified by the tag identification information defined by the definition data, in other words, when abnormal state detecting portion 173 receives no signal denoting communicability from any of RFID readers 110-1 to 110-4, abnormal state detecting portion 173 judges this case as abnormal.

Abnormal state detecting portion 173 also causes, via external reader communication portion 171, RFID reader 110-1, which has been detected to be communicable with RFID tag 301, to transmit a command inquiring whether RFID reader 110-1 is communicable with a user-dedicated RFID tag storing user identification information defined in combination with the tag identification information by the definition data. RFID reader 110-1 transmits a communication demand including the user identification information. A user-dedicated RFID tag storing in its memory the user identification information responds to the communication demand when user-dedicated RFID tag exists within communicable range 110-1A of RFID reader 110-1. Thus, abnormal state detecting portion 173 judges as normal the case of receiving a response from the user-dedicated RFID tag via external reader communication portion 171, and as abnormal the case of no reception. That is, abnormal state detecting portion 173 judges as normal the case where RFID tag 301 specified by the tag identification information defined by the definition data and a user-dedicated RFID tag storing in its memory the user identification information defined in combination with the tag identification information by the definition data exist within any one of communicable ranges 110-1A to 110-4A of RFID readers 110-1 to 110-4, respectively, and judges as abnormal the case where either RFID tag 301 or the user-dedicated RFID tag does not exist. This enables it to detect as abnormal the case where a sheet of paper 300 onto which data including confidential information is formed into image is taken away by a user other than the user who has designated the authenticated printing.

While the case of providing four RFID readers 110-1 to 110-4 is described here, when more than four RFID readers are provided, abnormal state detecting portion 173 drives a plurality of RFID readers in a power saving mode. Specifically, in a power saving mode, after RFID reader 110-1 is detected to be communicable with RFID tag 301, abnormal state detecting portion 173 drives only RFID reader 110-1 and a plurality of RFID readers located around RFID reader 110-1, whereas the rest of the RFID readers are not driven. When the RFID reader detected to be communicable is no longer communicable with RFID tag 301, abnormal state detecting portion 173 judges whether any of a plurality of surrounding RFID readers is communicable with RFID tag 301. Abnormal state detecting portion 173 then drives only an RFID reader, among the plurality of surrounding RFID readers, that has become communicable with RFID tag 301 and a plurality of RFID readers located around the RFID reader and discontinues the rest of the RFID readers. Thus, by reducing the number of RFID readers among the plurality of RFID readers, power consumption on the RFID readers can be reduced.

Discard control portion 155 accepts from operation portion 115 an instruction to leave sheet of paper 300 out of control or an instruction to discard sheet of paper 300. When accepting an instruction to leave sheet of paper 300 out of control, discard control portion 155 accepts the definition data from definition data control portion 153 and displays on display portion 114 the data identification information defined by the definition data. When the user designates the displayed data identification information, discard control portion 155 outputs to definition data control portion 153 an instruction to erase the definition data including the data identification information. Upon input of the deletion instruction, definition data control portion 153 erases definition data specified by the deletion instruction from RAM 112.

Also, discard control portion 155, when sheet of paper 300 is placed on manual feeding tray 47 and an erasure instruction is input in operation portion 115, causes image-forming portion 30 to form a black painted image all over both surfaces of sheet of paper 300 placed on manual feeding tray 47. Discard control portion 155 then outputs an instruction to erase the data identification information to RFID reader/writer control portion 157. When the erasure instruction is input from discard control portion 155, RFID reader/writer control portion 157 controls RFID reader/writer 121 in order to cause RFID reader/writer 121 to read the data identification information stored in the memory of RFID tag 301 mounted on sheet of paper 300 and then erase the data identification information from memory 315. RFID reader/writer control portion 157 outputs to discard control portion 155 the data identification information read by RFID reader/writer 121. Discard control portion 155 outputs to definition data control portion 153 an instruction to erase the definition data including the input data identification information. Upon input of the erasure instruction, definition data control portion 153 erases the definition data specified by the erasure instruction from RAM 112.

Figure 11:
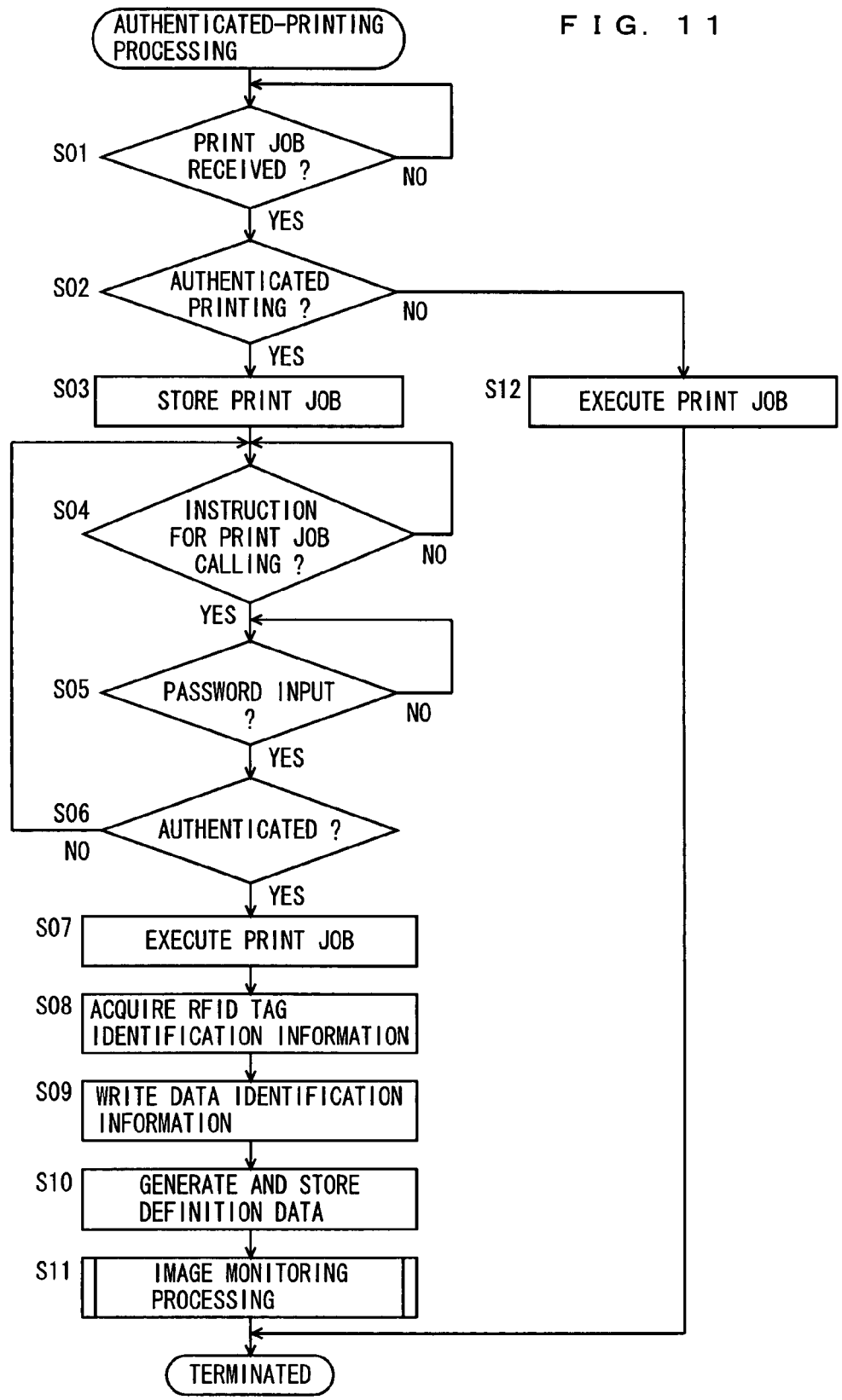
FIG. 11 is a flowchart showing an example of the flow of authenticated printing processing.

FIG. 11 is a flowchart showing an example of the flow of authenticated-printing processing. The authenticated-printing processing is executed by CPU 111 of MFP 100 by executing an authenticated-printing program. The authenticated-printing program is a part of the image monitoring program. Referring to FIG. 11, CPU 111 judges whether a print job is received (step S01). CPU 111 turns into a stand-by state until a print job is received ("NO" in step S01), and when a print job is received, the processing proceeds to step S02. In step S02, CPU 111 judges whether the print job is authenticated printing. When the print job includes a password, CPU 111 judges the print job as authenticated printing. For the authenticated printing, the processing proceeds to step S03, and otherwise, the processing proceeds to step S12. In step S12, CPU 111 executes the print job and terminates the processing. The execution of the print job here is processing that causes image-forming portion 30 to form an image based on print data included in the print job.

In the next step S03, CPU 111 stores the print job received in step S01 in RAM 112. CPU 111 then judges whether a calling instruction for the print job is received (step S04). The calling instruction for the print job includes accepting an authenticated-printing instruction input through operation portion 115 by the user and accepting an instruction to designate data identification information displayed on display portion 114 upon accepting of the authenticated-printing instruction. The data identification information displayed on display portion 114 upon accepting of the authenticated-printing instruction is data identification information for identifying the print data stored in RAM 112 in step S03.

Next, CPU 111 turns into a stand-by state until input of a password ("NO" in step S05), and the processing proceeds to step S06 upon input of a password. In step S06, CPU 111 carries out an authentication using the password and determines an authentication result. By referring to the combination of the print data and a password stored in RAM 112, CPU 111 judges as authenticated the case where the password input in step S05 matches the password put into combination with the print data specified by the data identification information designated for authenticated printing in step S04. When the authentication is successful ("YES" in step S06), the processing proceeds to step S07, and when the authentication is unsuccessful, the processing goes back to step S04.

In step S07, CPU 111 carries out the print job. Specifically, CPU 111 causes an image to be formed based on the print data specified by the data identification information accepted in step S04. The CPU 111 then acquires the tag identification information of RFID tag 301 (step S08). Specifically, CPU 111 causes RFID reader/writer 121 to read the tag identification information of FRID tag 301 mounted on sheet of paper 300 on which an image is formed, and receives the tag identification information from RFID reader/writer 121. CPU 111 then causes RFID reader/writer 121 to write the data identification information in memory 315 of FRID tag 301 (step S09).

Next, CPU 111 generates definition data including the tag identification information, the data identification, and the user identification information and stores the definition data in RAM 112 (step S10). CPU 111 then carries out image monitoring processing (step S11).

Figure 12:
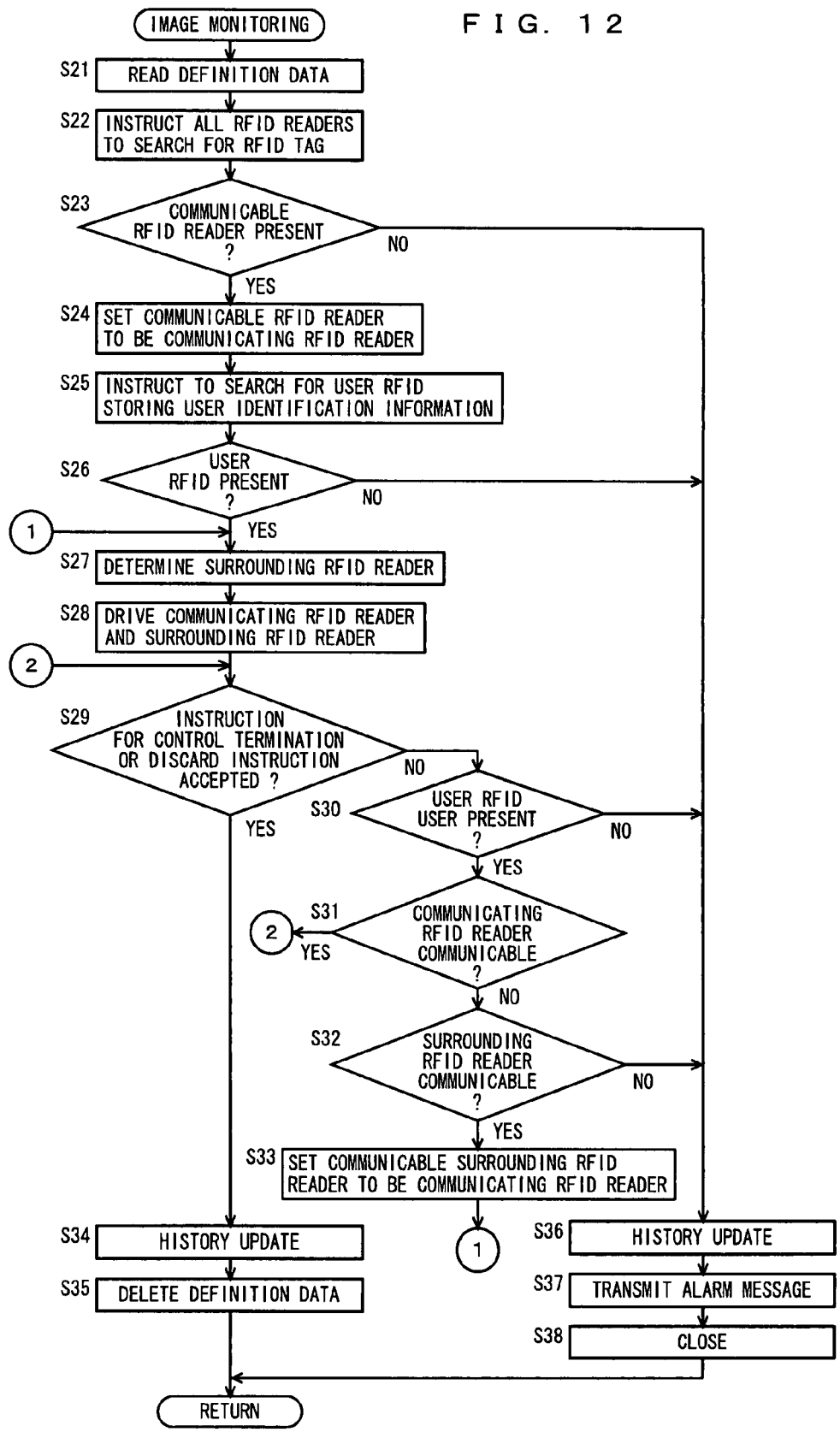
FIG. 12 is a diagram showing an example of the flow of image control processing.

FIG. 12 is a diagram showing an example of the flow of image control processing. Referring to FIG. 12, CPU 111 reads the definition data from RAM 112 (step S21). CPU 111 then outputs to all RFID readers 110-1 to 110-4 a search instruction for RFID tag 301 specified by the tag identification information defined by the definition data (step S22). Specifically, CPU 111 causes all RFID readers 110-1 to 110-4 to transmit a command to RFID tag 301 to inquire about inclusion of the tag identification information and communicability. CPU 111 then judges whether there is an RFID reader, among RFID readers 110-1 to 110-4, that is communicable with RFID tag 301 specified by the tag identification information defined by the definition data (step S23). CPU 111 judges whether there is an RFID reader, among RFID readers 110-1 to 110-4, that has received a response to the command inquiring about communicability. When there is at least one such RFID reader, the processing proceeds to step S24, and otherwise, the processing proceeds to step S36.

In step S24, CPU 111 sets as a communicating RFID reader the RFID reader communicable with RFID tag 301 specified by the tag identification information defined by the definition data. CPU 111 then outputs to the communicating RFID reader a search instruction for a user-dedicated RFID tag that stores the user identification information defined by the definition data (step S25). Specifically, CPU 111 causes the communicating RFID reader to transmit a command to the user-dedicated RFID tag to inquire about inclusion of the user identification information and communicability. CPU 111 then judges whether the user-dedicated RFID tag is present within the communicable range of the communicating RFID reader (step S26). When the user-dedicated RFID tag is present within the communicable range of the communicating RFID reader, the processing proceeds to step S27, and otherwise, the processing proceeds to step 36. CPU 111 judges that the user-dedicated RFID tag is present within the communicable range when the communicating RFID reader receives a response to the command inquiring about communicability.

In step S27, CPU 111 determines surrounding RFID readers. All RFID readers located around the RFID reader set as the communicating RFID reader in step S24 are determined as surrounding RFID readers. Next, CPU 111 drives the communicating RFID reader and the surrounding RFID readers (step S28). In other words, the other RFID readers than the communicating RFID reader and the surrounding RFID readers are not driven. Since power is not consumed on the other RFID readers than the communicating RFID reader and the surrounding RFID readers, power consumption can be reduced.

While in this embodiment RFID readers in the vicinity of the communicating RFID reader are set to be surrounding RFID readers located around the communicating RFID reader, it is possible to set RFID readers located within a predetermined distance (for example, within the range of 5 meters) from the communicating RFID reader to be surrounding RFID readers.

In step S29, CPU 111 judges whether a control completion instruction to leave sheet of paper 300 out of control or a discard instruction to discard sheet of paper 300 is received. When the instructions are received, the processing proceeds to step S34, and otherwise, the processing proceeds to step S30. In step S30, CPU 111 judges whether the user-dedicated RFID tag is present within the communicable range of the communicating RFID reader. When the user-dedicated RFID tag is present within the communicable range of the communicating RFID reader, the processing proceeds to step S31, and otherwise, the processing proceeds to step S36. In step S31, CPU 111 judges whether the communicating RFID reader is communicable with RFID tag 301 mounted on sheet of paper 300. When the communicating RFID reader is communicable with RFID tag 301, the processing goes back to step S29, and otherwise, the processing proceeds to step S32. In step S32, CPU 111 judges whether any of the surrounding RFID readers is communicable with RFID tag 301. When any of the surrounding RFID readers is communicable with RFID tag 301, the processing proceeds to step S33, and otherwise, the processing proceeds to step S36. In step S33, CPU 111 sets the surrounding RFID reader communicable with RFID tag 301 to be the communicating RFID reader, and the processing goes back to step S27.

In step S34, CPU 111 carries out history update. The history is information in which identification information for identifying the communicating RFID reader is added to the definition data. The history is stored in RAM 112. In the next step S35, the definition data read in step S21 is erased from RAM 112. This enables it to leave sheet of paper 300 out of control.

In step S36, CPU 111 carries out history update, as in step S34. Then CPU 111 transmits an alarm message (step S37). Specifically, CPU 111 transmits an electronic mail including the alarm message addressed to a predetermined electronic mail address of the administrator. The electronic mail may include the data identification information and user identification information defined by the definition data. In the next step S38, CPU 111 controls locking device 250 to close the room. This enables it to prevent sheet of paper 300 from being taken out.

Figure 13:
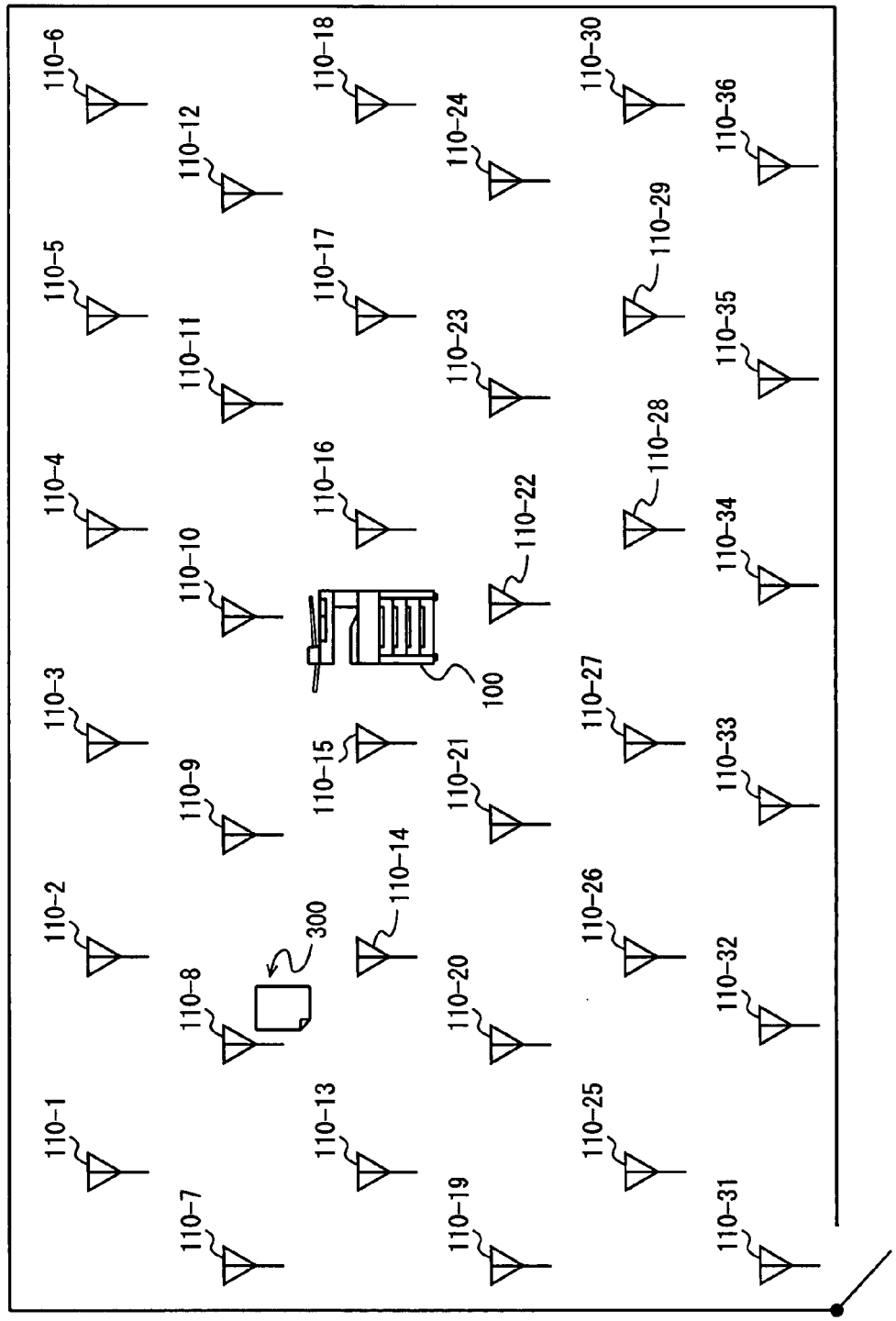
FIG. 13 is a diagram for describing the operation of the image monitoring system in the case of using 36 RFID readers.

FIG. 13 is a diagram for describing the operation of the image monitoring system in the case of using 36 RFID readers. Referring to FIG. 13, there are provided 36 RFID readers 110-1 to 110-36. When sheet of paper 300 is present within the communicable range of RFID reader 110-8, RFID reader 110-8 is set to be a communicating RFID reader, and RFID readers 110-1, 110-2, 110-7, 110-9, 110-13, and 110-14, which are around RFID reader 110-8, are set to be surrounding RFID readers. It is assumed that sheet of paper 300 in this state moves into the communicable range of RFID reader 110-9, which serves as a surrounding RFID reader. In this case, RFID reader 110-9, which serves as a surrounding RFID reader, is set to be a communicating RFID reader, and RFID readers 110-2, 110-3, 110-8, 110-10, 110-14, and 110-15, which are around RFID reader 110-9, are set to be surrounding RFID readers.

FIG. 14 is a flowchart showing an example of discard processing. The discard processing is executed by CPU 111 of MFP 100 by executing a discard program. The discard program is a part of the image monitoring program. Referring to FIG. 14, CPU 111 judges whether a document paper is placed on manual feeding tray 47 (step S41). CPU 111 turns into a stand-by state until a document paper is placed, and the processing proceeds to step S42 upon placement of a document paper.

In step S42, CPU 111 judges whether a discard instruction is accepted. When the discard instruction is accepted, the processing proceeds to step S43, and otherwise, the processing is terminated. In step S43, CPU 111 causes a black painted image to be formed all over the surfaces of sheet of paper 300 placed on manual feeding tray 47. This enables it to make visually unrecognizable the image of confidential information formed on sheet of paper 300.

In step S44, CPU 111 reads the data identification information from RFID tag 301 mounted on sheet of paper 300. CPU 111 then erases the data identification information stored in memory 315 of RFID tag 301 (step S45).

When the discard processing is executed, and the discard instruction is accepted in step S42, and the data identification information is read in step S44, then CPU 111 judges in step S29 of the image monitoring processing shown in FIG. 12 that the discard instruction is accepted, and the processing proceeds to step S34. Thus, the definition data is erased from RAM 112.

While in this embodiment the discard processing involves forming a black painted image all over the surfaces of sheet of paper 300, sheet of paper 300 can be cut by the post-processing portion 50. In this case, because RFID tag 301 is also broken, there is no need for erasing the data identification information in step S45.

FIG. 15 is a second plan view of the sheet of paper on which the RFID tag is mounted. Referring to FIG. 15, an RFID tag 301 is mounted on a sheet of paper 300A. An RFID antenna 303A, which is connected to RFID tag 301, is provided in such a manner as to avoid overlapping with punched holes 320. Thus, RFID antenna 303A is not damaged in the case of the sheet of paper being processed to provide punched holes 320, making it possible to provide RFID tag 301 with communicability.

FIG. 16 is a third view of the sheet of paper on which the RFID tag is mounted. Referring to FIG. 16, two RFID tags 301 and 301A are mounted on a sheet of paper 300B. RFID tag 301 is connected to an RFID antenna 303, and RFID tag 301A is connected to an RFID antenna 303A. Sheet of paper 300B is divided into two parts with RFID antenna 303 provided on one part and RFID antenna 303A provided on the other. Thus, when sheet of paper 300B is divided, RFID tag 301 and RFID antenna 303 are provided on one division and RFID tag 301A and RFID antenna 303A are provided on the other. This enables it to control the divided two parts separately.

FIG. 17 is a fourth plan view of the sheet of paper on which the RFID tag is mounted. Referring to FIG. 17, a passive type RFID tag 301B is mounted on a sheet of paper 300C. RFID tag 301B is connected to an RFID antenna 303B, and RFID antenna 303B is provided to cover substantially the entire surface of sheet of paper 300C. Thus, if the sheet of paper is divided into at least two parts, RFID antenna 303B is severed, depriving RFID tag 301B of communicability.

As described hereinbefore, MFP 100 in this embodiment forms an image based on print data onto sheet of paper 300 on which RFID tag 301 is mounted, acquires the tag identification information of RFID tag 301, and stores in RAM 112 definition data defining the tag identification information. When neither of RFID readers 110-1 to 110-4 is detected to be communicable with RFID tag 301 specified by the tag identification information defined the definition data, MFP 100 judges this case as abnormal. Thus, the case where sheet of paper 300 moves out of the communicable range of any of RFID readers 110-1 to 110-4, the case where antenna 303 of RFID tag 301 is damaged, and the case where sheet of paper 300 is stored in a space where communication is cut off are detected to be abnormal, which prevents sheet of paper 300 to be taken away, RFID tag from being removed off sheet of paper 300, and sheet of paper 300 from being stored in a container such as a bag.

Also, since print data in the authenticated printing controls the sheet of paper on which an image is formed, it becomes possible to restrict the number of sheets of paper that are under control.

Also, when RFID reader 110 communicable with RFID tag 301 specified by the tag identification information defined by the definition data is detected to be non-communicable with the user-dedicated RFID tag that stores user identification information that is put into combination with the tag identification information by the definition data, MFP 100 judges this case as abnormal. Since the case where the user who has instructed formation of an image in the authenticated printing and sheet of paper 300 on which the image is formed are not present within the communicable range of the same RFID reader is judged as abnormal, it becomes possible to prevent a sheet of paper onto which confidential information is formed into image from being taken out by others.

When there are a plurality of RFID readers, only the communicating RFID reader, which is communicable with RFID tag 301 specified by the tag identification information defined by the definition data, and a plurality of surrounding RFID readers, which are located around the communicating RFID reader, are activated, making it possible to save power.

While in this embodiment MFP 100 executes the authenticated-printing processing, it is possible that server 230 executes part of the authenticated-printing processing by controlling RFID readers 110-1 to 110-4. In this case, MFP 100, when executing a print job in the authenticated printing, transmits data identification information and tag identification information to server 230.

While a judgment is made of whether there is an RFID reader, among RFID readers 110-1 to 110-4, that is communicable with RFID tag 301 specified by the tag identification information defined by the definition data, a judgment can be made of whether there is an RFID reader that is communicable with RFID tag 301 that stores in memory 315 thereof the data identification information.

While in this embodiment the image-formed sheet of paper is monitored by carrying out the authenticated printing, it is possible to monitor sheets of paper in normal printing as well as in the authenticated printing. In this case, a judgment is made of whether there is an RFID reader that is communicable with an RFID tag that stores in memory 315 thereof the data identification information, irrespective of the user who has instructed the printing.

While in this embodiment description has been made of image monitoring system 1, it will be readily appreciated that the present invention can also be taken as an image monitoring method or an image monitoring program for causing MFP 100 or server 230 to execute the processing shown in FIGS. 11, 12, and 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image monitoring system comprising:
a print data accepting portion to accept print data;
an image-forming portion to form an image based on the print data onto a recording medium provided with a radio communication device having a memory and a communication portion;
a device identification information acquiring portion to acquire device identification information for identifying said radio communication device provided by said recording medium having formed thereon the image based on the print data;
a definition data storing portion to store definition data including the acquired device identification information;
a monitoring portion to communicate with a communicable radio communication device; and
an abnormal state detecting portion to judge as an abnormal state a case where said monitoring portion is detected to be first communicable then become non-communicable with said radio communication device specified by the device identification information included in the definition data.

2. The image monitoring system according to claim 1, further comprising a password accepting portion to accept a password, wherein:
said print data accepting portion accepts a password in addition to the print data;
said image-forming portion forms an image based on the print data on condition that said password accepting portion accepts the password identical with the password accepted in addition to the print data; and said definition data storing portion stores the definition data when said print data accepting portion accepts the password in addition to the print data.

3. The image monitoring system according to claim 1, further comprising an alarm portion to signal error information when said abnormal state detecting portion detects an abnormal state.

4. The image monitoring system according to claim 3, wherein said alarm portion transmits the error information to a predetermined destination, thereby signaling the error information.

5. The image monitoring system according to claim 1, further comprising a closing portion to close a gate of an area having located therein said monitoring portion when said abnormal state detecting portion detects an abnormal state.

6. An image monitoring system comprising:
a print data accepting portion to accept print data;
an image-forming portion to form an image based on the print data onto a recording medium provided with a radio communication device having a memory and a communication portion;
a device identification information acquiring portion to acquire device identification information for identifying said radio communication device provided by said recording medium having formed thereon the image based on the print data;
a definition data storing portion to store definition data including the acquired device identification information;
a monitoring portion to communicate with a communicable radio communication device; and
an abnormal state detecting portion to judge as an abnormal state a case where said monitoring portion is detected to be non-communicable with said radio communication device specified by the device identification information included in the definition data;
wherein:
said monitoring portion includes a plurality of radio monitoring portions communicable with said radio communication device when said radio communication device is present within a predetermined communicable range;
said plurality of radio monitoring portions include a first radio monitoring portion and a plurality of second radio monitoring portions located around said first radio monitoring portion, a communicable range of said first radio monitoring portion partially overlapping with each communicable range of said plurality of second radio monitoring portions; and
said abnormal state detecting portion judges as an abnormal state a case where all said plurality of radio monitoring portions are detected to be non-communicable with said radio communication device specified by the device identification information included in the definition data.

7. The image monitoring system according to claim 6, wherein further comprising:
a user identification information accepting portion to accept user identification information for identifying a user; and
a user-dedicated radio communication device carried by the user, said user-dedicated radio communication device storing the user identification information for identifying the user and being communicable with any one of said plurality of radio monitoring portions, wherein:

said definition data storing portion stores definition data including a combination of the device identification information and the accepted user identification information;
said monitoring portion further communicates with said user-dedicated radio communication device communicable; and
said abnormal state detecting portion judges as an abnormal state a case where among said plurality of radio monitoring portions, a radio monitoring portion communicable with said radio communication device specified by the device identification information included in the definition data is detected to be non-communicable with said user-dedicated radio communication device storing the user identification information put into combination with the device identification information by the definition data.

8. The image monitoring system according to claim 6, wherein said radio communication device is an RFID tag and said plurality of radio monitoring portions are RFID readers.

9. An image monitoring system comprising:
a print data accepting portion to accept print data;
an image-forming portion to form an image based on the print data onto a recording medium provided with a radio communication device having a memory and a communication portion;
a device identification information acquiring portion to acquire device identification information for identifying said radio communication device provided by said recording medium having formed thereon the image based on the print data;
a definition data storing portion to store definition data including the acquired device identification information;
a monitoring portion to communicate with a communicable radio communication device; and
an abnormal state detecting portion to judge as an abnormal state a case where said monitoring portion is detected to be non-communicable with said radio communication device specified by the device identification information included in the definition data;
wherein:
said monitoring portion includes a plurality of radio monitoring portions communicable with said radio communication device when said radio communication device is present within a predetermined communicable range;
said plurality of radio monitoring portions include a first radio monitoring portion and a plurality of second radio monitoring portions located around said first radio monitoring portion, a communicable range of said first radio monitoring portion partially overlapping with each communicable range of said plurality of second radio monitoring portions;
said image monitoring system further comprises a control portion to activate only a communicating radio monitoring portion, among said plurality of radio monitoring portions, that is communicable with said radio communication device specified by the device identification information included in the definition data and only a plurality of peripheral radio monitoring portions located around said communicating radio monitoring portion;
when said communicating radio monitoring portion is no longer able to communicate with said radio communication device, said abnormal state detecting portion detects a peripheral radio monitoring portion, among said plurality of peripheral radio monitoring portions, that is communicable with said radio communication device specified by the device identification information included in the definition data;

said control portion activates said peripheral radio monitoring portion detected by said abnormal state detecting portion to act as said communicating radio monitoring portion, and activates a plurality of radio monitoring portions located around said communicating radio monitoring portion newly set to act as said plurality of peripheral radio monitoring portions; and said abnormal state detecting portion detects that said communicating radio monitoring portion and said plurality of peripheral radio monitoring portions are all unable to communicate with said radio communication device specified by the device identification information included in the definition data.

10. An image monitoring system comprising:

a print data accepting portion to accept print data;

an image-forming portion to form an image based on the print data onto a recording medium provided with a radio communication device having a memory and a communication portion;

a device identification information acquiring portion to acquire device identification information for identifying said radio communication device provided by said recording medium having formed thereon the image based on the print data;

a definition data storing portion to store definition data including the acquired device identification information;

a monitoring portion to communicate with a communicable radio communication device;

an abnormal state detecting portion to judge as an abnormal state a case where said monitoring portion is detected to be non-communicable with said radio communication device specified by the device identification information included in the definition data;

an erasing portion to erase the definition data; and a discard portion to make unavailable the recording medium provided with said radio communication device specified by the device identification information included in the erased definition data.

11. The image monitoring system according to claim 10, wherein said discard portion cuts the recording medium provided with said radio communication device, thereby making unavailable the recording medium.

12. The image monitoring system according to claim 10, wherein said discard portion forms a black painted image over an entire surface of the recording medium provided with said radio communication device, thereby making unavailable the recording medium.

13. An image monitoring system comprising:

a print data accepting portion to accept print data;

an image-forming portion to form an image based on the print data onto a recording medium provided with a radio communication device having a memory and a communication portion;

a write control portion to transmit data identification information for identifying the print data to said radio communication device provided by said recording medium having formed thereon the image based on the print data and cause the data identification information to be written on said memory;

a definition data storing portion to store definition data including the data identification information;

a monitoring portion to communicate with said radio communication device communicable; and an abnormal state detecting portion to judge as an abnormal state a case where said monitoring portion is detected to be non-communicable with said radio communication device storing the same data identification information as the data identification information included in the definition data.

14. The image monitoring system according to claim 13, further comprising a password accepting portion to accept a password, wherein:

said image-forming portion forms an image based on the print data on condition that said password accepting portion accepts the password;

when said print data accepting portion accepts the password in addition to the print data, said write control portion transmits the data identification information to said radio communication device, thereby causing the data identification information to be written on said memory.

15. A method for monitoring an image comprising:

accepting print data;

forming an image based on the print data onto a recording medium provided with a radio communication device having a memory and a communication portion;

acquiring device identification information for identifying said radio communication device provided by said recording medium having formed thereon the image based on the print data;

storing definition data including the device identification information;

communicating with said radio communication device; and judging as an abnormal state a case where in said communicating step, communication with said radio communication device specified by the device identification information included in the definition data is first detected and is then detected to be impossible.

16. An image monitoring program stored on a nontransitory computer readable medium for causing a computer to execute processing comprising the steps of accepting print data;

forming an image based on the print data onto a recording medium provided with a radio communication device having a memory and a communication portion;

acquiring device identification information for identifying said radio communication device provided by said recording medium having formed thereon the image based on the print data;

storing definition data including the device identification information;

communicating with a communicable radio communication device; and judging as an abnormal state a case where in said communicating step, communication with said radio communication device specified by the device identification information included in the definition data is first detected and is then detected to be impossible.

* * * * *